Jan. 19, 1926. 1,569,970
G. H. GILMAN
DRILLING APPARATUS
Original Filed April 14, 1915 8 Sheets-Sheet 2
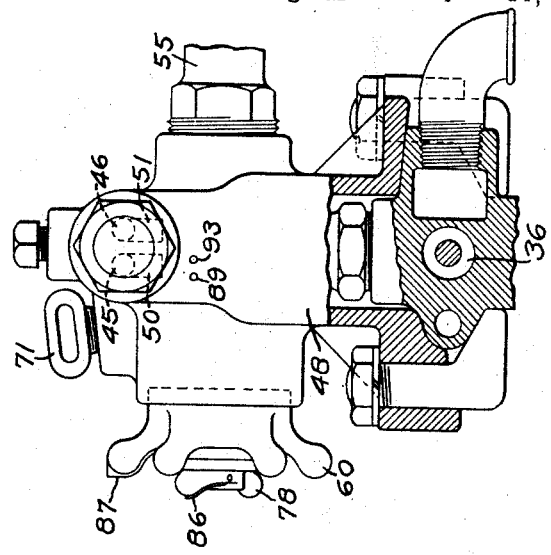
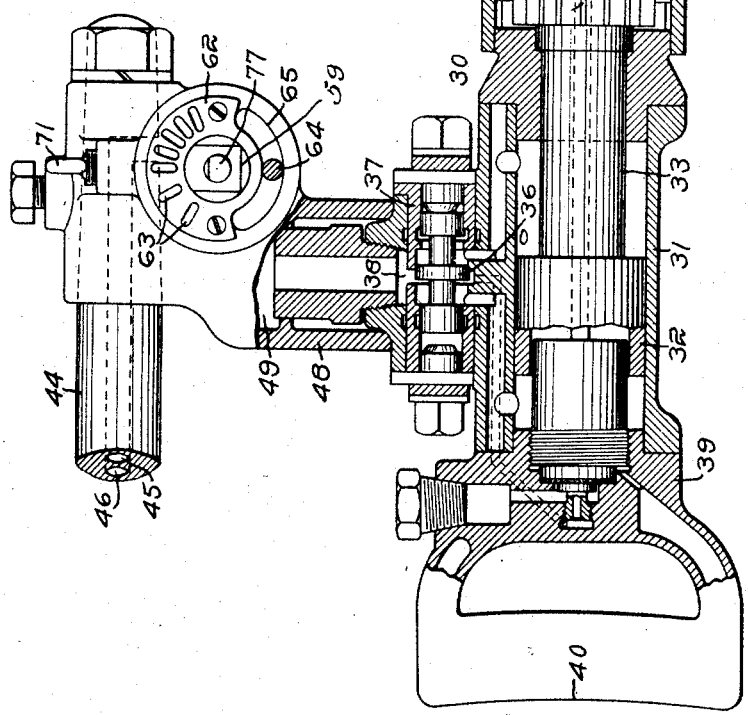
Inventor:
George H. Gilman,
by [signature]
Attys.

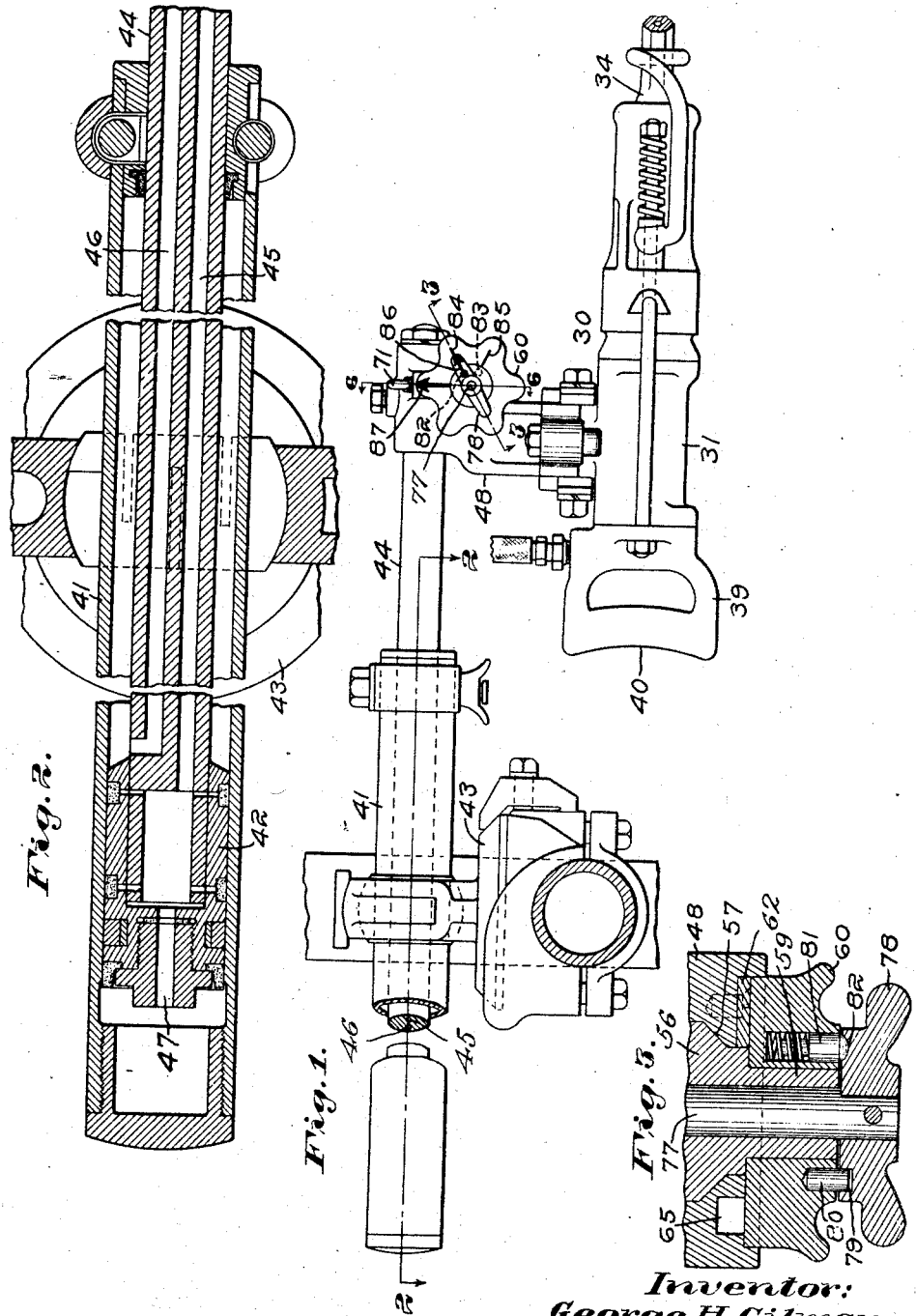

Jan. 19, 1926.　　　　　　G. H. GILMAN　　　　　　1,569,970
DRILLING APPARATUS
Original Filed April 14, 1915　　8 Sheets-Sheet 3
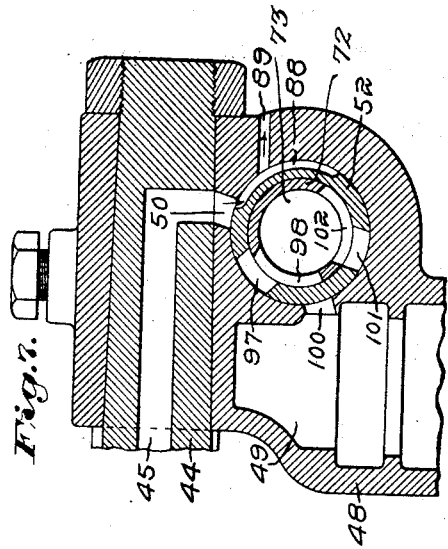
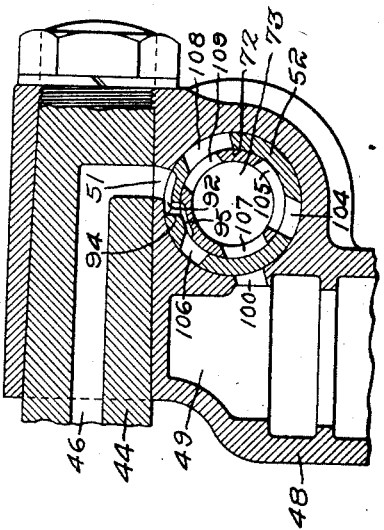
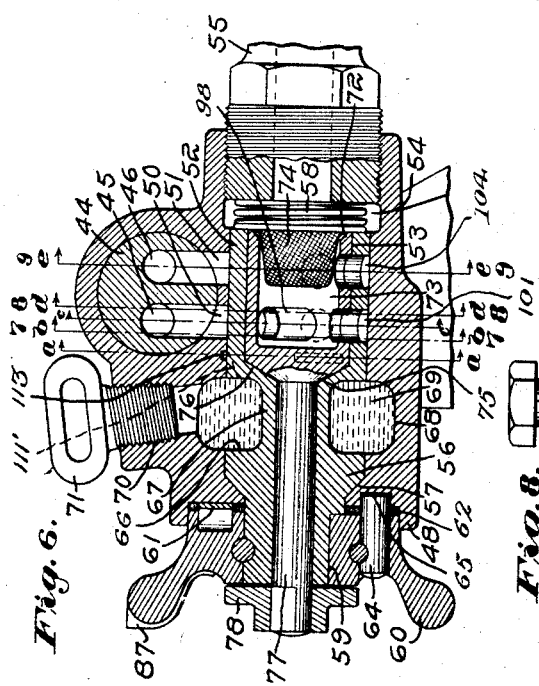
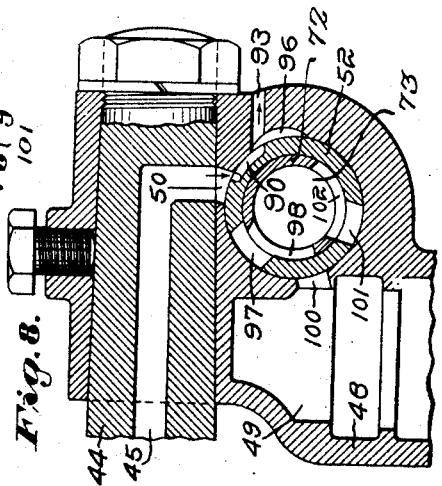
Inventor:
George H. Gilman,
by Macleod, Calver, Copeland & Dike
Attys.

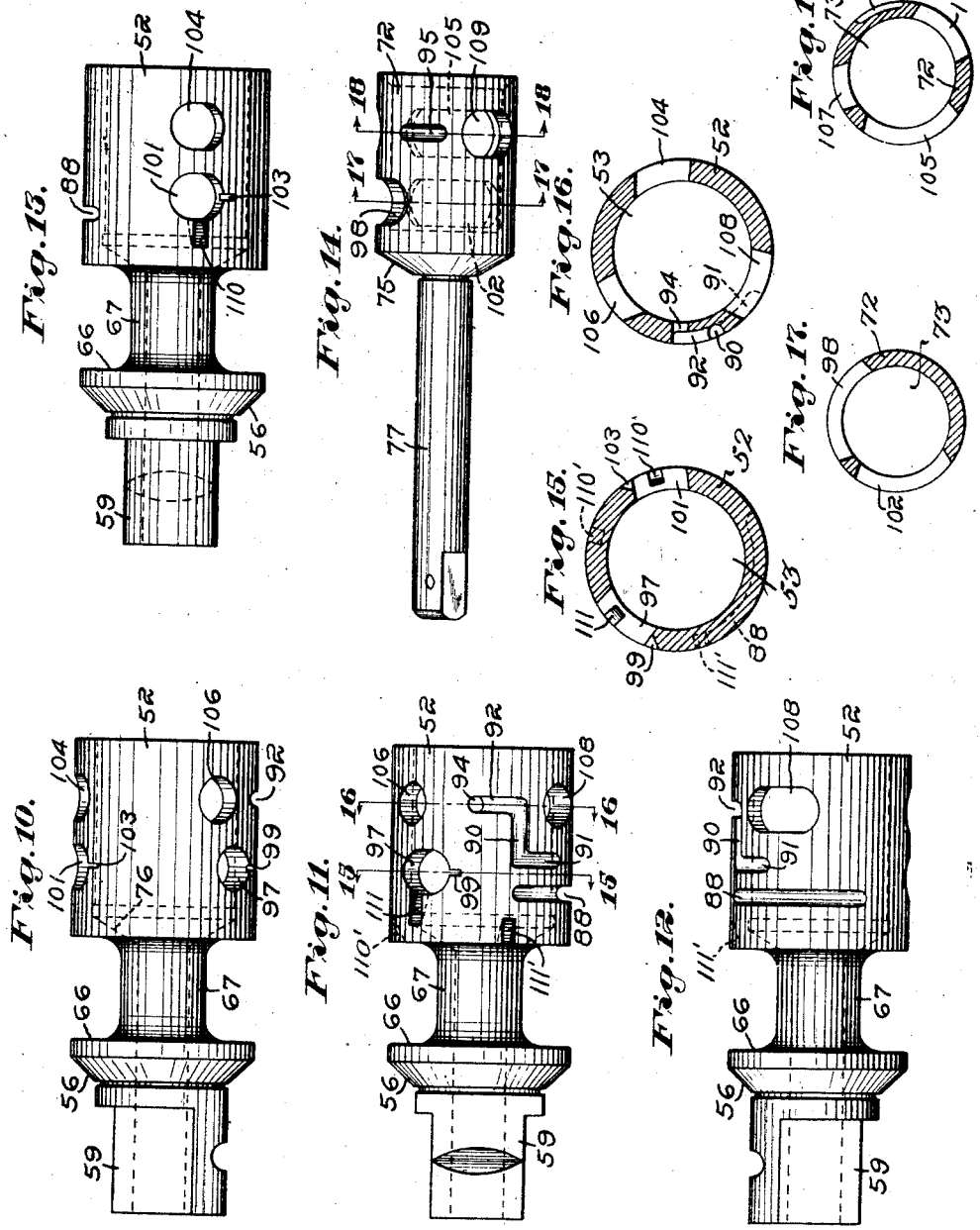

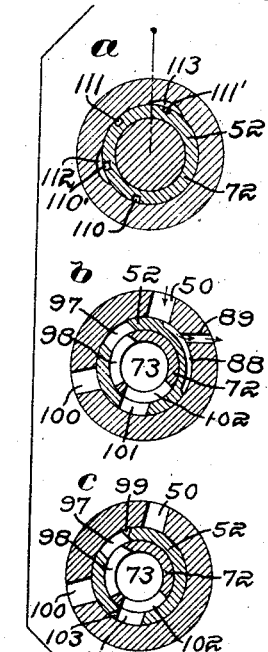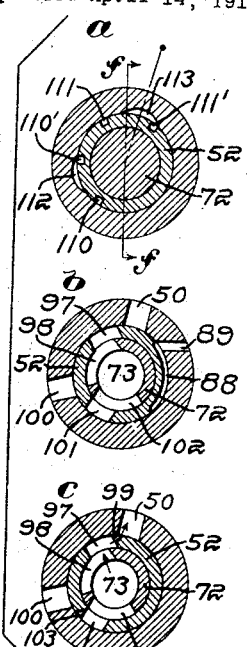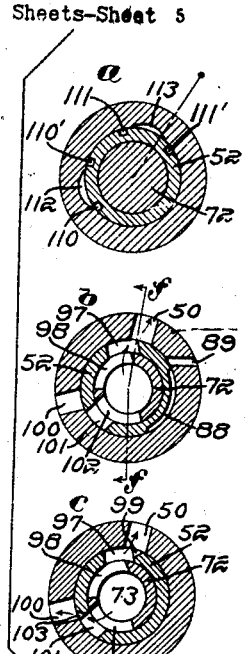

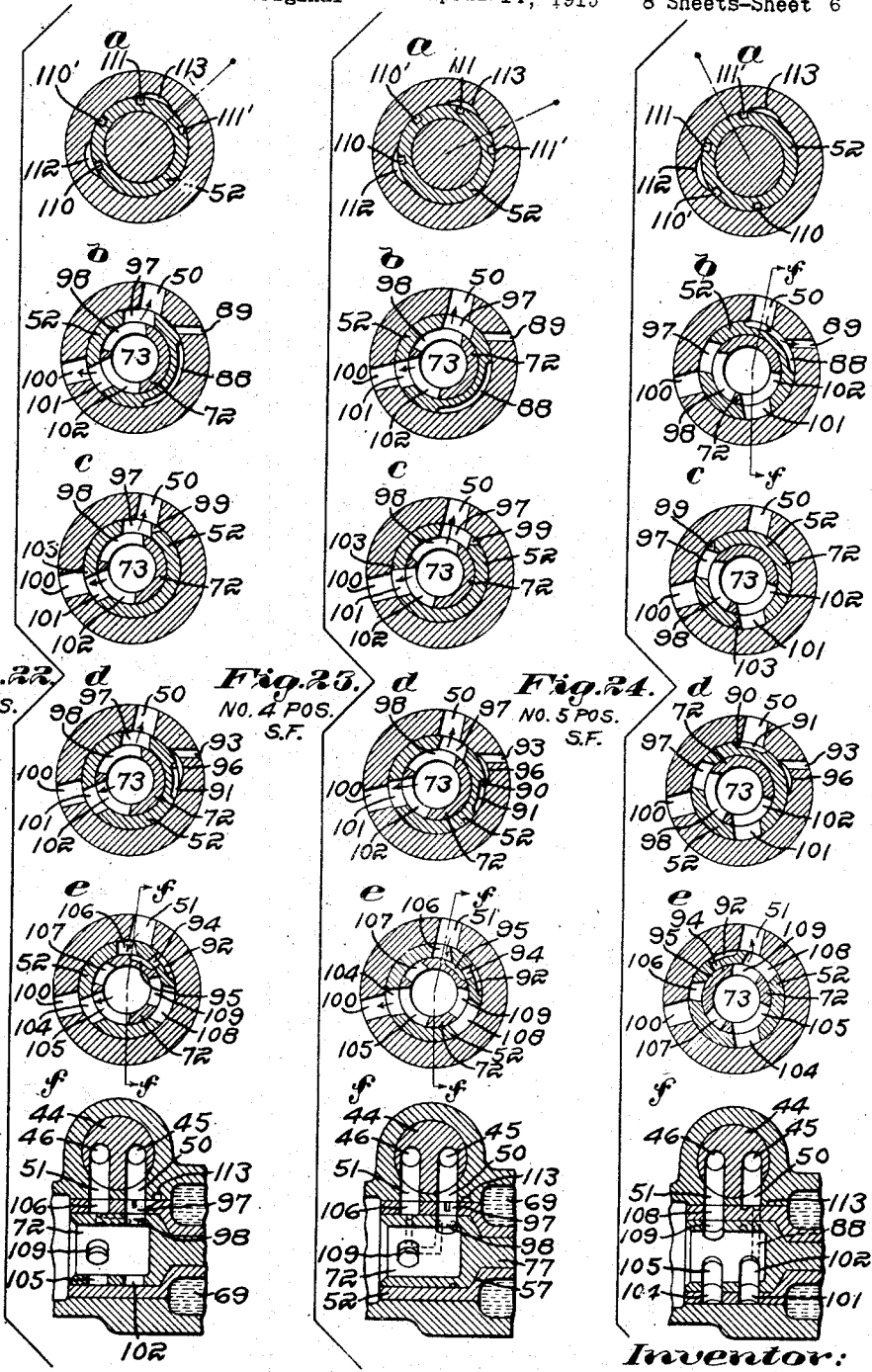

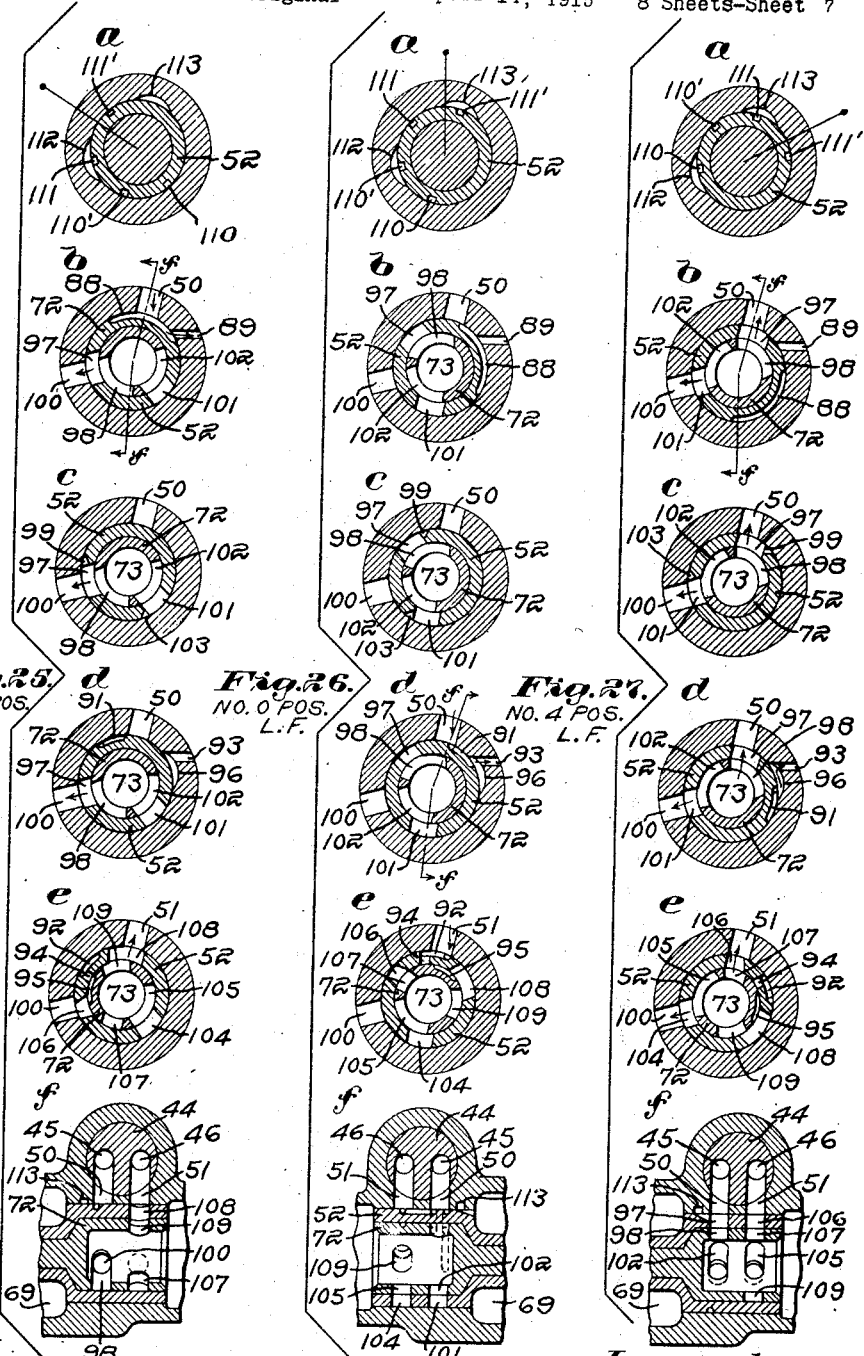

Jan. 19, 1926.

G. H. GILMAN 1,569,970

DRILLING APPARATUS

Original Filed April 14, 1915    8 Sheets-Sheet 8

NO. 5 POS. L.F.

NO. 6 POS. L.F.

Inventor:
George H. Gilman,
Attys.

Patented Jan. 19, 1926.

1,569,970

UNITED STATES PATENT OFFICE.

GEORGE H. GILMAN, OF BOSTON, MASSACHUSETTS, ASSIGNOR TO SULLIVAN MACHINERY COMPANY, OF BOSTON, MASSACHUSETTS, A CORPORATION OF MASSACHUSETTS.

DRILLING APPARATUS.

Application filed April 14, 1915, Serial No. 21,435. Renewed November 2, 1922. Serial No. 598,646.

*To all whom it may concern:*

Be it known that I, GEORGE H. GILMAN, a citizen of the United States, and a resident of Boston, Suffolk County, Massachusetts, have invented an Improvement in Drilling Apparatus, of which the following description, in connection with the accompanying drawings, is a specification, like characters on the drawings representing like parts.

This invention relates to feeding mechanisms, and is more particularly, though not exclusively, concerned with a pressure fluid impact or percussive drilling tool, having pressure fluid means for advancing the tool toward, or retracting it from, its work, and means for coordinately controlling the tool and the feeding means in such a manner that the tool can be advanced or retracted under a relatively heavy pressure, or a relatively light pressure, at the will of the operator.

My invention will be best understood by reference to the following specification, when taken in connection with the accompanying drawing of one illustrative embodiment thereof, while its scope will be more particularly pointed out in the appended claims.

In the drawings:

Fig. 1 is a side elevation, partly broken away and partly in section, of a drilling apparatus embodying my invention;

Fig. 2 is a sectional view on an enlarged scale, partly broken away, on line 2—2 of Fig. 1, looking in the direction of the arrows on said line;

Fig. 3 is a detail sectional view on an enlarged scale on line 3—3 of Fig. 1, looking in the direction of the arrows on said line;

Fig. 4 is a central, vertical, longitudinal section, partly in elevation, of the drilling tool, showing a portion of the feeding mechanism and its controlling device in elevation, parts being removed to show details of construction;

Fig. 5 is an elevation, partly in transverse section of a portion of the parts shown in Fig. 4, as viewed from the righthand side thereof, certain of the parts omitted from Fig. 4 being shown in place;

Fig. 6 is a sectional view on an enlarged scale on line 6—6 of Fig. 1, looking toward the left;

Fig. 7 is a sectional view on line 7—7 of Fig. 6, looking in the direction of the arrows on said line;

Fig. 8 is a sectional view, on line 8—8 of Fig. 6, looking in the direction of the arrows on said line;

Fig. 9 is a sectional view on line 9—9 of Fig. 6, looking in the direction of the arrows on said line;

Fig. 10 is a plan of the main controlling or throttle valve;

Fig. 11 is a front elevation of the controlling valve shown in Fig. 10;

Fig. 12 is a bottom plan of the throttle valve shown in Fig. 10;

Fig. 13 is an elevation of the main controlling valve viewed from the opposite side to that shown in Fig. 11;

Fig. 14 is an elevation of the supplemental controlling valve;

Fig. 15 is a sectional view on line 15—15 of Fig. 11, looking in the direction of the arrows on said line;

Fig. 16 is a sectional view on line 16—16 of Fig. 11, looking in the direction of the arrows on said line;

Fig. 17 is a sectional view on line 17—17 of Fig. 14, looking in the direction of the arrows on said line;

Fig. 18 is a sectional view on line 18—18 of Fig. 14, looking in the direction of the arrows on said line;

Figure 28:
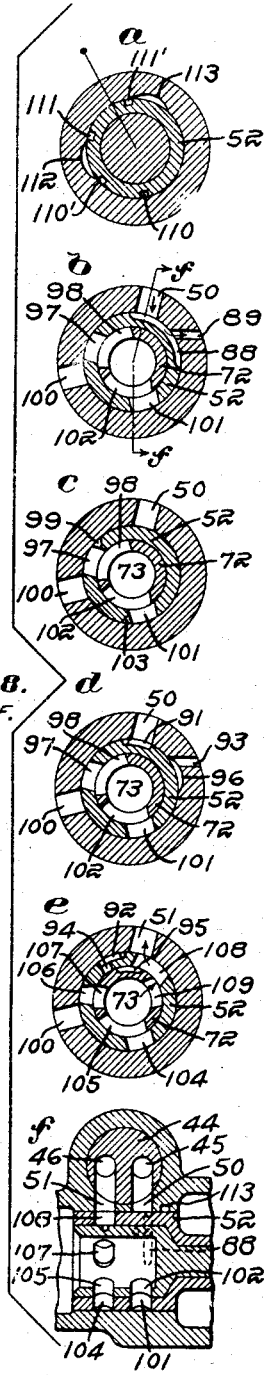

Figs. 19 to 29, inclusive, are groups of detail sectional views illustrating the main and supplemental throttle valves in various positions of adjustments, each group comprising six views, namely: *a, b, c, d, e,* and *f,* enclosed by bracket. In each group, the view *a* is a sectional view on line *a—a* of Fig. 6; the view *b* is a sectional view on line *b—b* corresponding to line 7—7 of Fig. 6; the view *c* is a sectional view on line *c—c* of Fig. 6; the view *d* is a sectional view on line *d—d*, corresponding to line 8—8 of Fig. 6; the view *e* is a sectional view on line *e—e,* corresponding to the line 9—9 of Fig. 6; and the view *f* is a sectional view corresponding in a general way to the axial section of the valve in Fig. 6, viewed from the opposite direction, though in some instances the plan of the section is irregular, and is varied as shown by the section lines *f—f* in each figure.

Referring to the drawings, and to the embodiment of my invention which I have selected for illustration, I have there shown a drilling apparatus comprising a drilling tool 30, having a cylinder 31 within which a piston 32 is arranged to reciprocate. This piston may actuate a suitable working tool in any appropriate manner, but is herein provided with a reduced portion 33, constituting a hammer bar extension adapted to deliver a rapid succession of blows upon the inner end of a drill-bit 34 held in a chuck 35 in any usual or desired manner.

The drilling tool may be either the valveless or valved type, but the latter is preferred, and is provided herein with a pressure fluid distributing valve 36, working in a valve casing 37, the latter having a pressure fluid supply space 38, from which pressure fluid under the control of the valve is delivered to opposite ends of the cylinder, and is exhausted therefrom in any appropriate manner, which it will be unnecessary here to describe, since it forms no essential part of my present invention.

The cylinder is herein provided with a rear cylinder head in the form of a head-block 39, provided with a grasping handle 40. The type of tool selected for illustration is a hand tool,—that is to say, it is primarily intended for work of the class where it can be supported and held up to its work within the grasp of the operator, and the construction of the present apparatus is such that the drilling tool may be readily detached and used as a separate instrument, should occasion require.

The feeding device may be of any suitable character, but herein is pressure-fluid operated, and comprises a feed cylinder member 41 and a feed piston member 42, one of which may be attached to a suitable support and the other to the drilling tool. As herein shown, the feed cylinder member is attached to a swivel member 43, while the feed piston member is provided with a piston rod 44, to which the drilling tool is attached.

Preferably, the feeding device is double-acting,—that is to say, it is capable of advancing the drilling tool toward or retracting it from its work, and to that end, the piston rod 44 is herein provided with a passage 45, leading to the rear end of the piston, and a passage 46 leading to its front end, so that if pressure fluid be supplied to the passage 45 only, the tool will be advanced; and on the other hand, if pressure fluid be supplied to the passage 46 only, the tool will be retracted.

It should here be observed that the area upon which pressure acts to force the piston forward is equal to the area of the piston's full circle, while the effective area of the forward end of the piston is equal to the area of the piston's full circle, minus the area of the piston rod. It will thus be seen that the piston is provided with opposed differential pressure areas. If pressure fluid be supplied to the rear area only, the piston and the tool carried thereby will be advanced. On the other hand, if pressure fluid be supplied to the front area only, the piston and tool will be retracted, the force in each case being directly proportional to the area of the surface acted upon by the pressure fluid. Naturally, if pressure fluid be supplied to the rear area only, the piston and tool will be advanced with the maximum feeding effect. If, however, appropriate means are provided whereby the operator is enabled at will to supply pressure fluid to the front and rear pressure areas of the piston simultaneously, the latter is caused to advance with a force equal to the difference between the two opposed unbalanced forces acting upon the piston. By this means, the operator is enabled to secure at will a feeding pressure much lighter or weaker than the normal feeding pressure, and the change from one to the other can be instantly made, as circumstances and the nature of the work require. These results may be attained by the use of controlling means in the form of two valves, which I will presently describe.

In the particular apparatus selected for illustration, the drilling tool and feeding mechanism are not in line,—that is to say, they are not coaxially arranged, but it will be understood that any desired arrangement of these parts may be made, without departing from the spirit and scope of the invention as defined by the appended claims. The drilling tool 30 may be secured to the piston rod 44 by any appropriate means, such for example as an intermediate member 48, forming a rigid connection therebetween, and serving as a casing or housing for the controlling valve, or valves, presently described. As herein shown, the intermediate connecting member 48 is provided with a pressure fluid passage 49, communicating with the supply space 38 of the drilling tool 30, and passages 50 and 51, communicating respectively with the passages 45 and 46 in the piston rod 44. These passages are herein controlled by the controlling or throttle valves, which I will now describe, and which constitute one of the principal features of my invention.

Preferably mounted in the intermediate connecting member 48, is a controlling device, herein in the form of a throttle valve 52, having capacity for co-ordinately controlling the drilling tool and the feeding mechanism. This throttle valve is herein provided with an axial chamber 53, the purpose of which will presently appear, and receives its supply of pressure fluid from a pressure fluid inlet 54, to which is connected a pressure fluid supply conduit 55. The valve is herein provided with a shoulder 56, resting on a seat 57, against which it is held by a suitable spring 58, pressing against the opposite end of the valve.

As a means for turning the valve, the latter is herein provided with a stem 59, to which is secured a handle 60, and if desired, the valve may be held in the selected adjustment by a detent spring 61, cooperating with a plate 62 provided with a series of depressions or perforations 63, corresponding in number and location to the several definite positions of adjustment, in which it is desired that the valve shall be held. As a means for limiting the turning movement of the valve, its handle 60 herein carries a stop pin 64, which plays to and fro in a segmental slot 65, whose extent is such as to define the limits of turning movement of the valve.

As herein shown, the valve 52 is provided with a circumferential groove 66 forming a reduced portion or neck 67, forming, together with a groove 68 in the member 48, a chamber 69 to serve as a reservoir for lubricating oil which may be fed to the drilling tool and to the feeding mechanism at intervals during the operation of the apparatus under the control of the throttle valve 52, in a manner which will be described hereinafter. The chamber 69 is herein provided with an opening 70, through which it may be filled, and this opening may be closed by a suitable closure, herein in the form of a threaded plug 71.

The valve 52, which I have now described in a general way, and which will be described more particularly hereinafter, may be designated the main controlling valve, since it is intended to be employed directly as a means for securing the proper order of events in the operation of the machine.

I will now describe the preferred form of valve for permitting the operator at will to cause pressure fluid to be supplied to both areas of the feed piston, whereby the latter is caused to exert a lessened feeding effect as compared with that which is employed when pressure fluid is supplied to the rear end only of the feed piston. This valve may be termed a supplemental controlling valve, and is designated by the numeral 72.

The supplemental controlling valve 72 may be otherwise suitably constructed and arranged, but herein is placed within the chamber 53 of the valve 52 concentrically with relation to the latter, and is provided with a chamber 73, which is directly in communication with the pressure fluid supply space 54, from which it receives the supply of pressure fluid through a suitable gauze screen or strainer 74. The valve 72 is herein provided with a shoulder 75 resting against a seat 76 formed within the main controlling valve 52, and is provided with a stem 77 which extends axially through the stem 59 of the main controlling valve to a point beyond the outer end of the latter, where it is provided with a grasping handle 78. As a means for limiting the turning movement of the supplemental controlling valve 72, its handle 78 is herein provided with a segmental slot 79, which receives a pin 80 secured to the grasping handle 60 of the main controlling valve. The supplemental controlling valve may be held definitely in either of its positions of adjustment by a spring-pressed pin 81, having a rounded end engaging either of two depressions 82 and 83 formed in the under side of the grasping handle 78, whereby the latter may be simply turned from one position to the other by the application of a sufficient amount of force, and will be held in the desired position of adjustment by the spring pin, until purposely shifted. These two positions of adjustment may be indicated by radial lines, or other suitable markings 84 and 85, and the handle 78 may be provided with an arrow or indicator 86, as shown in Fig. 1. The mark or line 84 may be designated S. F., to signify strong feed, and the line 85 L. F. to indicate light feed. By placing these marks and identification symbols on the parts, the operator is enabled to tell at a glance how the handle 78 should be placed to obtain the desired result. If desired, the grasping handle 60 may also be provided with an arrow 87, which will serve to indicate to the operator the position which the main controlling valve occupies.

The controlling valves may be otherwise suitably formed with ports and passages for the control of the tool and the feeding means, but I prefer to employ the arrangement of ports and passages which I will now describe.

The circumferential surface of the main controlling valve 52 is herein provided with a segmental groove 88, which in certain positions of the main valve establishes communication between the "forward feed" passage 45, 50, and an exhaust port or vent 89 leading to the atmosphere (see Figs. 7 and 19, particularly Fig. 19$^b$). The circumferential surface of the main valve is also herein provided with a groove 90 having a circumferential portion 91 in the plane d—d, and a circumferential portion 92 in the plane e—e connected by a portion which extends lengthwise of the valve.

When the main valve is in its zero or neutral position, the circumferential portion 91 of the groove 90 registers with the passages 50, 45, leading to the "forward feed" end of the feed piston, and also registers with a port 93 leading to the atmosphere. In certain positions of the main valve, the circumferential portion 92 of the groove 90 registers with the passages 51, 46, leading to the "reverse feed" end of the feed piston. It should here be observed that the circumferential portion 92 of the groove 90 terminates in a perforation 94, which extends entirely through the circumferential wall of the main valve, and in certain positions of the supplemental valve registers with a circumferential groove 95 in the latter. Reverting now to the atmospheric vent or port 93, it will be noted that its inner end terminates in a groove 96, which extends circumferentially in the wall or seat which encircles the main valve, so that during a considerable portion of the turning movement of the main valve, the circumferential portion 91 of the groove 90 remains in communication with the atmospheric air vent 93, as will be evident by examining the view d in Figs. 19, 20, 21, 22, 23, 26 and 27. It will now be apparent that when the main valve is in its zero or neutral position, as shown in Figs. 7, 8 and 19, both ends of the feed cylinder are in communication with the atmosphere, whereby the feed piston may be adjusted manually without any restraint being imposed thereon by reason of air being trapped in the feed cylinder.

The passage 50, 45, leading to the rear end of the feed cylinder, is supplied with pressure fluid to advance the tool by a port 97 extending entirely through the circumferential wall of the main valve, and in both positions of the supplemental valve registering with a port 98 extending entirely through the circumferential wall of the supplemental valve to the interior chamber of the latter. It should here be observed that the port 97 is extended circumferentially by a narrow slot 99, which at certain times in the operation of the machine affords a restricted port opening to the rear end of the feed cylinder (see Fig. 20ᵉ). The ports 97 and 98 are also utilized at a certain time in the operation of the machine, as hereinafter described, to establish communication between the pressure fluid supply and a port 100 communicating with the passage 49 leading to the drilling tool.

During the normal operation of the tool, the port 100 leading thereto is placed in communication with the pressure fluid supply by a port 101 extending through the circumferential wall of the main valve, and in both positions of the supplemental valve registering with a port 102 extending through the circumferential wall of the latter into communication with its central pressure fluid supply chamber. As a means for causing a very small supply of pressure fluid to be delivered to the drilling tool to run the same slowly and "spot" the hole, the port 101 is herein circumferentially elongated by a narrow slot 103, which is adapted to register with the port 100 leading to the tool in advance of the main portion of the port 101 (see Fig. 21ᵉ).

The port 100 leading to the tool is elongated lengthwise of the main and supplemental valves, and the latter, in addition to the ports 101 and 102 just described, are provided respectively with ports 104 and 105, the former extending entirely through the circumferential wall of the main valve and the port 105 extending entirely through the circumferential wall of the supplemental valve. The ports 104 and 105 are practically duplicates of the ports 101 and 102, respectively, except that the port 104 is provided with no circumferential enlargement corresponding to the slot 103.

The main valve is further provided with a port 106, extending entirely through the circumferential wall thereof. In one position of the supplemental valve, this port communicates with the circumferential groove 95 in the supplemental valve, while in the other position of the latter, this port registers with the port 107 extending entirely through the circumferential wall of the supplemental valve, whereby in a certain position of the main valve (see Fig. 27ᵉ), pressure fluid is supplied to the "reverse feed" or forward end of the feed cylinder, while in another position of the main valve (Fig. 29ᵉ), pressure fluid is supplied by way of the ports 107 and 106 to the port 100 leading to the tool.

The main valve is provided with still another port 108 extending entirely through its circumferential wall, and which in both positions of the supplemental valve registers with a port 109 extending entirely through the circumferential wall of the latter, and thus communicates with the interior chamber of the supplemental valve. In four positions of the main valve (see Figs. 24ᵉ, 25ᵉ, 28ᵉ and 29ᵉ), the ports 108 and 109 establish communication between the pressure fluid supply and the "reverse feed" passages 51, 46, leading to the front end of the feed cylinder, whereby in such position, the tool is retracted.

As a means for causing oil to be fed to the tool and to the feeding mechanism under the control of the main controlling valve, the latter is herein provided with a pair of lengthwise grooves 110 and 110' cooperating with an oil pocket 112, and with a second pair of similar grooves 111 and 111' cooperating with an oil pocket 113. The groove 111 communicates with, and in effect forms a part of, the port 97, while the groove 110 communicates with and forms in effect a part of the port 101. The grooves 110' and 111' communicate at all times with the oil reservoir 69, leading directly thereto. It should here be observed that the grooves 110 and 111 are arranged in staggered relation with the grooves 110' and 111',—that is to say, the ends of the grooves 110 and 111 extend beyond the ends of the grooves 110' and 111', so that a certain portion of each groove lies in a plane $a$—$a$. This plane also contains the oil pockets 112 and 113.

Referring now to Fig. 19ª, it will be understood that the grooves 110 and 111 are out of register with the oil pockets 112 and 113 respectively, while the grooves 110' and 111' are in register with said pockets, respectively. Therefore, the oil pockets at this time are in communication with the oil chamber 69, and receive oil therefrom. When, however, the main valve is turned from the position shown in Fig. 19ª to the position shown in Fig. 23ª, the grooves 110 and 111 register with the oil pockets 112 and 113, respectively, whereby the oil previously deposited in said pockets is allowed to flow by way of the grooves 110 and 111, respectively, to the ports 97 and 101, and thence to the feeding mechanism and tool, respectively. When the valve is again returned to the position shown in Fig. 19ª, the grooves 110' and 111' again register with the oil pockets 112 and 113, respectively, and the supply of oil for said pockets is replenished from the reservoir. It will thus be seen that, with respect to each pair of oil grooves and its oil pocket, as the valve is turned to and fro, said grooves are placed alternately in communication with the oil pocket, and hence a small charge of oil is alternately supplied to the pocket from the reservoir, and discharged from the pocket into the path of the pressure fluid entering the machine by way of the valve ports.

Having described in detail the main and supplemental controlling valves, I will now describe the general operation of the drilling apparatus, and the various events which occur in turning the valves to their various positions, reference being had to Figs. 19 to 29, inclusive, which show several positions occupied by the valves in the use of the machine.

It will be remembered that the supplemental valve has two positions, with relation to the main valve. One of these relative positions is represented in Figs. 19 to 25, inclusive, and shows the supplemental valve in such positions that pressure fluid is supplied to the rear end only of the feed piston when the main valve is turned into such position as to permit the feed of the pressure fluid thereto. In the other position of the supplemental valve with relation to the main valve represented in Figs. 26 to 29, inclusive, pressure fluid is supplied to both ends of the feed cylinder simultaneously, when the main valve is in the proper position. This position is represented in Fig. 27 (see views $b$ and $e$ thereof). With the valves thus placed, pressure fluid is supplied to both ends of the feed cylinder and, owing to the differential front and rear areas of the feed piston, the latter is urged forward at a greatly reduced pressure, as compared with that which is obtained when the pressure fluid is supplied to the rear area only of the feed piston.

I will now describe in detail the several events which take place while the supplemental valve is set for a strong or heavy feed, having reference now to Figs. 19 to 25, inclusive.

When the main valve is placed in its zero or neutral position shown in Fig. 19, the supply of pressure fluid to the ports of the feed cylinder and tool is cut off, and both ends of the feed cylinder are open to the atmosphere, whereby the same may be moved freely to and fro with relation to the feed piston, so that the preliminary adjustment of the machine may be accomplished. The machine is then placed so that the end of the drill-bit is against or adjacent the work, and the feed device is contracted,—that is to say, the feed piston is adjacent the rear end of the feed cylinder.

Having properly arranged the machine as will be readily understood by those skilled in the art, the operator then grasps the handle 60 and turns the same clockwise from the initial or neutral position shown in Fig. 19 toward the No. 1 position shown in Fig. 20. When the latter is reached, a limited supply of pressure fluid is admitted to the "forward feed" end of the feed cylinder by way of the ports 98, 97, groove 99, and passages 50 and 45 (see Fig. 20°), to cause the machine to be advanced slowly to its work, it being understood that at this time, the "reverse feed" end of the cylinder is open to exhaust, by way of the passages 46 and 51, grooves 92, 90, 91 (see Figs. 20ᵈ and 20ᵉ) and atmospheric vent 93. The feed piston is thereby worked out gradually, until the drill-bit brings up against its work.

Assuming the drill-bit now to be pressed firmly against the work, the operator continues to turn the handle 60 of the main valve clockwise from the No. 1 position shown in Fig. 20 to the No. 2 position shown in Fig. 21. A full supply of pressure fluid is now admitted to the "forward feed" end of the feed cylinder, the "reverse feed" end of the cylinder being still open to exhaust as before. A limited supply of pressure fluid is now admitted to the drilling tool by way of the ports 102, 101, groove 103 and passage 100 (see Fig. 21°). The size of the groove 103 is such as to admit at this time only a sufficient amount of pressure fluid to operate the drilling tool slowly to "spot" the hole.

The hole having been started, the operator next turns the main controlling valve to the No. 3 position shown in Fig. 22. With the valve in this position, the conditions already described in connection with the No. 2 position are continued, except that the pressure fluid supply port leading to the drilling tool is opened further (see Fig. 22ᵈ), and the drilling tool receives practically its full supply of pressure fluid. In this position also the exhaust from the port 51 takes place through the port 106, groove 95, and port 94 to the groove 92 instead of from the port 51 to the groove 92 directly. The operator continues to turn the valve from the No. 3 position shown in Fig. 22 to the No. 4 position shown in Fig. 23, the conditions now being the same as before, except that the ports leading to the drilling tool and to the "forward feed" end of the feed cylinder are now open to their full extent.

The machine is now in full operation, and the valve is maintained in this position until the hole has been drilled to the desired depth, whereupon the valve is turned contra-clockwise to its initial or neutral position. This reversal of the valve is of course accompanied by a reversal of the described order of events, leaving the machine with all ports closed as before.

Continuing to turn the valve contra-clockwise past the No. 0 or neutral position to the No. 5 position shown in Fig. 24, it will be observed that the forward feed end of the feed cylinder is opened to exhaust by way of the passage 50, groove 88 and atmospheric vent 89 (see Fig. 24ᵇ). Pressure fluid is now supplied to the "reverse feed" end of the feed cylinder, by way of the ports 109, 108, and passage 51 (see Fig. 24ᶜ), thus causing the tool to be retracted and withdrawn from the drilled hole. Should it be desired to operate the drilling tool while the latter is being retracted, the operator continues to turn the valve contra-clockwise from the No. 5 position shown in Fig. 24 to the No. 6 position shown in Fig. 25. Conditions are now maintained as in the No. 5 position, except that pressure fluid is admitted to the tool by way of the ports 98 and 97, and passage 100 (see Fig. 25ᵈ).

The various positions assumed by the main controlling valve during the operation of the machine have just been described with reference to the position of the supplemental controlling valve in which a heavy or strong feed is maintained. Under certain conditions of work, it is desirable to operate the tool with the lessened feed pressure, while still securing the results already described in connection with the operation of the main controlling valve. To this end, I have provided the supplemental controlling valve, whereby what may be termed a light feed may be secured at the will of the operator, by simply turning the supplemental valve to the position L. F.

Referring now to Figs. 26, 27, 28 and 29, I have there shown the supplemental controlling valve in its "light feed" position. When the supplemental valve is so placed, and the main controlling valve is in its zero or neutral position (see Fig. 26), the supply of pressure fluid to the feed mechanism and the controlling tool is shut off, and both ends of the feed cylinder are in communication with the atmosphere, the conditions being precisely the same as in the zero "strong feed" position shown in Fig. 19.

Turning the valve from the zero position shown in Fig. 6 through the intervening positions to the No. 4 position shown in Fig. 27 now causes the pressure fluid to be admitted to the forward feed end of the cylinder by way of the ports 98 and 97 and the passage 50 (see Fig. 27ᵇ), as well as to the "reverse feed" end of the feed cylinder, by way of the ports 107 and 106 and the passage 105 (see Fig. 27ᶜ).

In this position, pressure fluid is admitted to the tool, as in the No. 4 "strong feed" position shown in Fig. 23. The drilling tool is now in operation, but is fed with a lessened degree of pressure, owing to the fact that pressure fluid is supplied to both ends of the cylinder, and the feed piston is advanced because of its differential areas, as hereinbefore explained.

Turning the main controlling valve from the No. 4 position shown in Fig. 27 to the No. 5 position shown in Fig. 28, it will be observed that pressure fluid is still admitted to the "reverse feed" end of the feed cylinder, but is shut off from the tool, as well as from the "forward feed" end of the feed cylinder. When in this position, the conditions established are practically the same as those existing in the No. 5 "strong feed" position shown in Fig. 24, and the controlling tool is withdrawn from the work, while out of operation.

Figure 29:
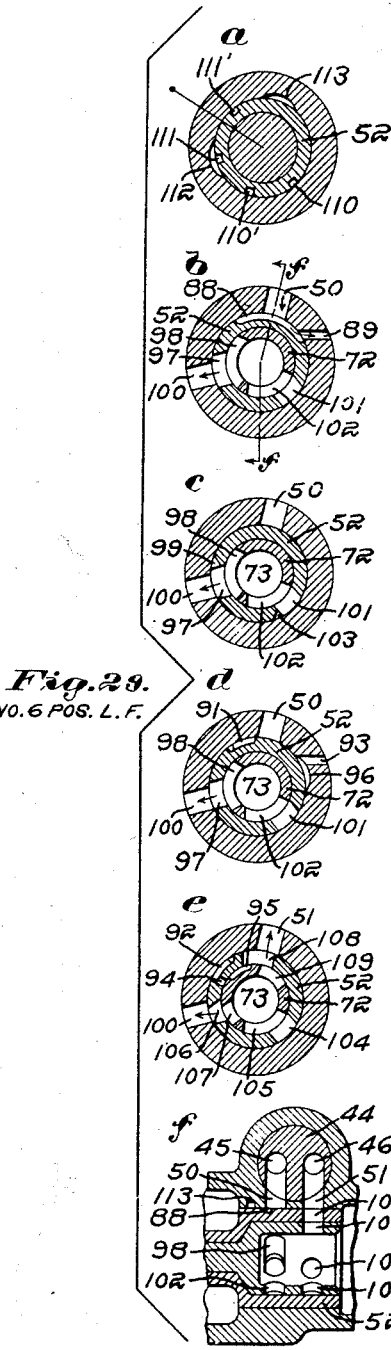

Should it be desired to operate the tool while it is being withdrawn, the valve may be turned from the No. 5 position shown in Fig. 28 to the No. 6 position shown in Fig. 29, whereupon conditions are continued as in the No. 5 position, except that pressure fluid is now admitted to the tool by way of the ports 98 and 97, and the passage 100, whereby the drill steel is readily freed, should there be any tendency for it to stick in the drilled hole.

It should now be apparent that by the use of the described main and supplemental controlling valves, a very complete and wide range of control of the machine is obtainable by a simple controlling means, so arranged that there is no possibility whatever of the operator making any mistake, and the desired operations take place in their proper sequence, without any attention on his part, other than to simply turn the handle continuously from one position to another, according to the circumstances.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts nor to its specific embodiment herein shown, but that extensive deviations from the illustrated form or embodiment of the invention may be made without departing from the principles thereof.

Having thus described my invention, what I claim and desire by Letters Patent to procure is:—

1. Drilling apparatus comprising in combination a drill bit; automatic drill bit rotating means; a percussive engine; pressure fluid actuated feeding and retracting means for moving said percussive engine toward and away from the work, said feeding and retracting means being offset from but in substantially parallel relation to said drill bit; drill bit retaining means engaging said percussive engine and said drill bit and permitting retraction of said drill bit when said percussive engine is retracted by said retracting means; and coordinately controlled pressure fluid control means permitting simultaneously effective operation of said retracting means and said drill bit rotating means or, at the option of the operator, operation of said retracting means without operation of said drill bit rotating means.

2. In an apparatus of the character described, the combination with drilling mechanism, of feeding means therefor, and means for controlling said feeding means including a plurality of jointly movable elements one adjustable relative to the other to vary the result of operation thereof.

3. In an apparatus of the character described, the combination with drilling mechanism, of feeding means employing oppositely acting unequal forces to effect feeding movement of said drilling mechanism, and means for controlling said feeding means including a plurality of jointly movable elements one adjustable relative to another to vary the result of operation thereof.

4. In an apparatus of the character described, the combination with drilling mechanism, of pressure fluid actuated feeding means therefor, a main valve for controlling the admission of pressure fluid to said feeding means, and a supplemental valve for varying the flow therethrough to said main valve, said supplemental valve in one position causing operation of said main valve to produce a strong feeding thrust of said feeding means and in another position causing a similar operation of said main valve to produce a light feeding thrust of said feeding means.

5. In an apparatus of the character described, the combination with drilling mechanism, of pressure fluid actuated feeding means therefor, a main valve for controlling the admission of pressure fluid to said feeding means, and a supplemental valve carried by and movable with said main valve but adjustable relative thereto to vary the effect of operation of the latter, said supplemental valve in different positions causing operation of said main valve to produce different feeding thrusts of said feeding means.

6. In an apparatus of the character described, the combination with drilling mechanism, of pressure fluid actuated feeding means therefor, said feeding means comprising a cylinder and a piston therein having differential areas, and means including a plurality of jointly movable elements for controlling the admission of pressure fluid to said feeding means, one of said elements being adjustable relative to the other to cause operation of the latter to admit pressure fluid to one side of said piston or to cause a similar operation thereof to admit pressure fluid to both sides of said piston.

7. In an apparatus of the character described, the combination with drilling mechanism, of feeding means employing oppositely acting unequal forces to effect feeding movement of said drilling mechanism, and means for conjointly controlling said drilling mechanism and feeding means including a plurality of elements one movable with the other and adjustable relative thereto to cause operation of the latter to produce application of one of said unequal forces or to cause a similar operation thereof to produce application of both of said forces.

8. In an apparatus of the character described, the combination with pressure fluid actuated drilling mechanism, of pressure fluid actuated feeding means therefor, a main valve for conjointly controlling the admission of pressure fluid to said drilling mechanism and feeding means, and a supplemental valve for varying the flow of fluid through said main valve, said supplemental valve in one position causing operation of said main valve to produce a strong feeding thrust of said feeding means and in another position causing a similar operation of said main valve to produce a light feeding thrust of said feeding means.

9. The combination with a pressure fluid motor and pressure fluid feeding means therefor, of two valves one valve having means for conjointly controlling said motor and feeding means and the other having means for causing said feeding means to operate at a plurality of predetermined effective pressures, and means whereby said last mentioned valve may move with said first mentioned valve during a portion of the operation thereof.

10. The combination with a pressure fluid motor and pressure fluid feeding means therefor, of two valves one valve having means for conjointly controlling said motor and feeding means and the other having means for causing said feeding means to operate at a plurality of predetermined effective pressures, and means whereby said last mentioned valve may move with said first mentioned valve during a portion of the operation thereof or whereby said last mentioned valve may be adjusted relative to said first mentioned valve.

11. The combination with a pressure fluid motor and pressure fluid feeding means therefor, of two valves one valve having means for conjointly controlling said motor and feeding means and the other having means for causing said feeding means to operate at a plurality of predetermined effective pressures, and means whereby during a predetermined operation of said first mentioned valve said last mentioned valve may move therewith or whereby said last mentioned valve may be adjusted relative to said first mentioned valve and thereafter move therewith.

12. The combination with a pressure fluid motor and pressure fluid feeding means therefor, of two valves one valve having means for conjointly controlling said motor and feeding means and the other having means for causing said feeding means to operate at a plurality of predetermined effective pressures, and operative connections between said valves whereby one may be adjusted relative to the other and the two valves thereafter operated simultaneously.

13. The combination with a pressure fluid motor and pressure fluid feeding means therefor, of controlling mechanism including a valve operative in its different positions to advance the motor to the work, operate the same slowly, and subsequently more rapidly, and cooperating controlling mechanism movable therewith and adjustable relative thereto to vary the feeding effect.

14. The combination with a pressure fluid motor and pressure fluid feeding means therefor, of controlling mechanism including a valve operative in its different positions to advance the motor to the work, operate the same slowly, and subsequently more rapidly, and thereafter reverse the feed, and co-operating controlling mechanism movable therewith and adjustable relative thereto to vary the feeding effect.

15. The combination with a pressure fluid motor and pressure fluid feeding means therefor, of controlling mechanism including a valve operative in its different positions to advance the motor to the work, operate the same slowly, and subsequently more rapidly, and thereafter reverse the feed while operating the motor, and cooperating controlling mechanism movable therewith and adjustable relative thereto to vary the feeding effect.

16. The combination with a pressure fluid motor, pressure fluid feeding mechanism, and lubricating means therefor, of controlling mechanism including a valve operative in its different positions to advance the motor toward the work, operate the same slowly and subsequently more rapidly, and during the operation of the mechanism supply lubricant thereto, and cooperating controlling mechanism movable therewith and adjustable relative thereto to vary the feeding effect.

17. A pressure fluid feed mechanism comprising, in combination, a cylinder; a piston therein having differential areas; and a plurality of concentrically arranged valves having one relative position in which pressure fluid is supplied to both areas of said piston and another relative position in which pressure fluid is supplied to one area only of said piston.

18. A pressure fluid feed mechanism comprising, in combination, a cylinder; a piston therein having differential areas; and a plurality of concentrically arranged valves having a common fluid supply and provided with ports which in one relative position of said valves cause pressure fluid to be supplied to both areas of said piston and in another relative position cause pressure fluid to be supplied to one area only of said piston.

19. The combination with a pressure fluid motor and pressure fluid feeding means therefor; of means for conjointly controlling said motor and feeding means; and coordinately controlled means movable therewith and controlling fluid pressures upon opposed surfaces of different areas to vary the effective thrust of said feeding means.

20. The combination with a pressure fluid motor and pressure fluid feeding means therefor; of means for conjointly controlling said motor and feeding means; and coordinately controlled means movable therewith and adjustable relative thereto and controlling oppositely acting forces at will to vary the effective thrust of said feeding means.

21. The combination with a pressure fluid motor and pressure fluid feeding means therefor; of a valve for conjointly controlling said motor and feeding means, and another but coordinately controlled valve controlling oppositely acting forces for causing said feeding means to operate at a plurality of predetermined effective pressures.

22. The combination with a pressure fluid motor and pressure fluid feeding means therefor; of two valves, one carried by the other, one valve having means for conjointly controlling said motor and feeding means, and the other having means for causing said feeding means to operate at a plurality of predetermined effective pressures.

23. The combination with a pressure fluid motor and pressure fluid feeding means therefor; of main controlling means having one position in which pressure fluid is admitted to said feeding means but excluded from said motor, and another position in which fluid is admitted to said feeding means and said motor, and supplemental but coordinately controlled pressure fluid controlling means movable therewith and having a plurality of positions in which said feeding means is rendered effective to produce different degrees of thrust.

24. The combination with a pressure fluid motor and pressure fluid feeding means therefor; of main controlling means having one position in which pressure fluid is admitted to said feeding means but excluded from said motor, and another position in which fluid is admitted to said feeding means and said motor, and supplemental controlling means carried by said main controlling means and having a plurality of positions in which said feeding means is rendered effective to produce different degrees of thrust.

25. The combination with a pressure fluid motor and pressure fluid feeding means therefor; of a main controlling valve having one position in which pressure fluid is admitted to said feeding means but excluded from said motor, and another position in which fluid is admitted to said feeding means and said motor, and a supplemental controlling valve arranged concentrically with relation to and carried by said main controlling valve and having a plurality of positions in which said feeding means is rendered effective to produce different degrees of thrust.

26. In a drilling mechanism, a rock drill, and feeding means therefor comprising relatively reciprocable cylinder and piston elements, one operatively connected to said drill and the other adapted to be held stationary during drilling, means to cause said elements to. effect forward feed of said rock drill including a ported valve chamber, conduit means connecting the same wih the interior of said cylinder, a ported valve member in said chamber, a fluid supply connection opening into the end of said chamber, and auxiliary valve means operatively connected to said valve member interposed between said fluid supply connection and said conduit means for controlling fluid flow through said valve member.

27. In a drilling mechanism, a rock drill, and feeding means therefor comprising relatively reciprocable cylinder and piston elements, one operatively connected to said drill and the other adapted to be held stationary during drilling, means to cause said elements to provide a feeding force of variable intensity comprising a plurality of coaxially arranged valves controlling the supply of operating fluid to said elements, and operating means therefor including an element operative on movement to cause simultaneous movement of said valves and an element operative on movement to move one of said valves relative to the other.

28. In a rock drilling apparatus, a drilling motor, and feeding means therefor comprising relatively movable cylinder and piston elements, one operatively connected to said motor and the other held stationary during feeding, and controlling means for said motor and feeding means including a plurality of coaxially arranged valves, one of which is rotatable to control the timing of the initiation of feed and motor operation and the other of which is movable to control the force of the feed.

29. In a rock drilling apparatus, the combination with a plurality of work performing members, one of which comprises a feeding mechanism, of means for controlling both of said members, and means for controlling one of said members operatively connected to said other means.

30. In a rock drilling mechanism, the combination with a plurality of work performing members, one of which comprises a feeding mechanism, of means for controlling both of said members, and means for controlling one of said members operatively connected to said other means and operable independently of the latter.

In testimony whereof, I have signed my name to this specification.

GEORGE H. GILMAN.